United States Patent Office 3,111,518
Patented Nov. 19, 1963

3,111,518
PROCESS FOR THE MANUFACTURE OF NEW TRIAZINE DERIVATIVES AND OF DYESTUFFS OBTAINED THEREFROM
Eduard Moergeli, Muttenz, Switzerland, assignor to Ciba Limited, Basel, Switzerland, a company of Switzerland
No Drawing. Filed Feb. 24, 1961, Ser. No. 91,316
Claims priority, application Switzerland Feb. 29, 1960
1 Claim. (Cl. 260—248)

2-(o-hydroxyaryl)-4:6-dichloro-1:3:5-triazines are valuable intermediate products for the manufacture of vat dyestuffs. Hitherto it has only been possible to obtain these compounds by a troublesome method, for example, in four stages by the condensation of dicyandiamide with an appropriate o-alkoxy-aryl-carboxylic acid chloride by way of biuret to form the ortho-alkoxy-aryl-guanamide, which latter is converted by treatment with a phosphorus halide into the ortho-alkoxy-aryl-4:6-dichloro-triazine, and in the latter the alkoxy group is split off by hydrolysis with a hydrohalic acid.

The present invention is based on the observation that 2-(2'-hydroxynaphthyl-1')-4:6-dihalogen-1:3:5-triazines are obtained in a single stage by condensing a β-hydroxynaphthalene with cyanuric chloride in the presence of aluminum chloride.

As a β-hydroxynaphthalene there is advantageously used 2-hydroxynaphthalene. There may also be used substituted 2-hydroxy-naphthalenes, for example, halogenated 2-hydroxynaphthalenes having a free 1-position, for example, 2-hydroxy-6-chloro- or 2-hydroxy-6-bromo-naphthalene. There may also be mentioned 2:6- and 2:7-di-hydroxynaphthalene.

The relative proportions of the reaction components are advantageously so chosen that approximately one molecular proportion of cyanuric chloride is used for each molecular proportion of the β-hydroxy-naphthalene. In this case there are obtained both mono-hydroxynaphthalene and di-hydroxynaphthalene products, which contain a dichloro triazine radical. In the case of di-hydroxynaphthalenes two dichloro-triazine radicals can be introduced by using two molecular proportions of cyanuric chloride. There is advantageously used approximately one molecular proportion of aluminum chloride for each molecular proportion of cyanuric chloride.

The reaction is advantageously carried out in the presence of an inert organic solvent, for example, carbon disulfide or especially benzene, or a halogenated benzene, such as chlorobenzene, ortho-dichlorobenzene or trichlorobenzene, advantageously at a temperature within the range of 0° C. to 100° C., while stirring. As the reaction is exothermic it is generally not necessary to supply external heat.

The products are advantageously worked up by pouring the reaction mixture into dilute hydrochloric acid, advantageously while cooling by the addition of ice. The solvent is advantageously removed by extraction or steam distillation. As the products are obtained in an excellent state of purity, further purification, for example, by recrystallization, is usually unnecessary.

The 2-(β-hydroxy-naphthyl-α)-4:6-dihalogen-1:3:5-triazines so obtained advantageously correspond to the general formula
(1)

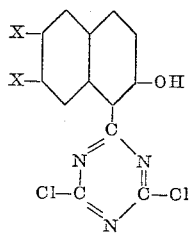

in which one X represents a hydrogen atom and the other X represents a hydrogen or halogen atom or a hydroxyl group. These compounds may be treated with a halogenating agent, especially chlorine or bromine, to introduce halogen into the naphthalene nucleus. When a brominating agent is used, the chlorine atoms of the triazine radical are also partially replaced by bromine atoms.

From the triazine derivatives of the invention valuable vat dyestuffs can be obtained by reaction with vattable amines, especially α-amino-anthraquinones. There is advantageously used one molecular proportion of the aminoanthraquinone for each exchangeable halogen atom. The compounds of the Formula 1 are therefore advantageously reacted with two molecular proportions of amino anthraquinone. As suitable amino anthraquinones there may be mentioned more especially monoamino-anthraquinones, for example, 1-amino-anthraquinone and simple substitution products thereof, for example, 1-amino-4-, -5- or 6-methoxy-anthraquinone, 1-amino-3-, -6- or 7-chloranthraquinone, 1-amino-4-, -5- or -8-acylamino, and especially benzoylamino-anthraquinone. The latter may be substituted in the benzoyl groups, for example, by halogen atoms or methoxy, alkyl, trifluoromethyl, sulfonamide or alkyl-sulfone groups. There may also be mentioned 1:4-diamino-2-acetyl-anthraquinone and 1:4-diamino-2-benzoyl anthraquinone, in which under normal conditions only the amino group in the 4-position is capable of being acylated. There are therefore included aminoanthraquinones which contain fused-on carbocyclic or heterocyclic rings, for example, 4-aminoanthraquinone-2:1(N)-benzacridone, 5-amino-1:9-isothiazole-anthrone, 4- or 5-aminoanthrapyrimidine, monoaminoacedianthrones, 4- or 5-amino-1:1'-dianthrimide-carbazole, 4- or 5-amino-5'-benzoylamino-dianthrimide-carbazole or 4-amino-4'-benzoyl-amino-dianthrimide-carbazole, 4-amino-anthrapyridones, amino-dibenzanthrone, aminoisodibenzanthrone, aminodibenzyrenequinone, aminoanthanthrone, aminobenzanthrone or aminoflavanthrone.

The reaction of the 2-(2'-hydroxynaphthyl-1')-4:6-dihalogen-triazines with the amino anthraquinones is advantageously carried out in an inert organic solvent, for example, nitrobenzene, chlorobenzene or ortho-dichlorobenzene at a raised temperature.

The dyestuffs so obtained are suitable for dyeing a very wide variety of materials, for example, as pigments, but especially for dyeing or printing textile materials, especially those of natural or regenerated cellulose, by the usual vat dyeing process or printing methods. The dyeings so obtained are distinguished by their very good fastness to light and properties of wet fastness.

The following examples illustrate the invention the parts and percentages being by weight unless otherwise stated, and the relationship of parts by weight to parts by volume being the same as that of the kilogram to the liter.

*Example 1*

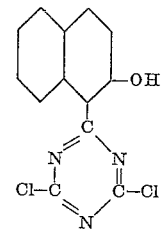

30.5 parts of finely pulverized aluminum chloride are introduced at room temperature, while stirring, into a mixture of 32.5 parts of 2-naphthol, 41.5 of cyanuric chloride and 270 parts by volume of benzene, while stirring, during which the temperature may rise for a short time to 50° C. The whole is subsequently stirred for 20 hours at room temperature, and the pasty reaction product is decomposed by pouring it into dilute hydrochloric acid. The benzene is then distilled off with steam in the course of 10 minutes. The residue is filtered off, pulverized, and washed with hydrochloric acid of 1% strength and 300 parts by volume of acetone. After dyeing the product at 50 to 60° C. in vacuo, there are obtained 56.5 parts of 2-(2'-hydroxynaphthyl-1')-4:6-dichloro-1:3:5-triazines in an excellent state of purity. It melts at 212 to 213° C. A product purified by recrystallization from ortho-dichlorobenzene melts at 215 to 216° C.

By using, instead of the 2-naphthol an equimolecular proportion of 6-bromo-2-hydroxy-naphthalene, there is obtained 2-(6'-bromo-2'-hydroxy-naphthyl-1')-4:6-dichloro-1:3:5-triazine, which melts at 208° C. (corrected).

A solution of 3.5 parts of bromine and 20 parts by volume of nitrobenzene is introduced dropwise in the course of one hour at 120° C., while stirring, into a mixture of 5.8 parts of 2-(2'-hydroxynaphthyl-1')-4:6-dichloro-1:3:5-triazine obtained as described in paragraph 1 and 40 parts by volume of nitrobenzene. The whole is stirred for a further hour, then allowed to cool and the precipitate which is probably 2-(2'-hydroxy-6'-bromonaphthyl-1')-4-chloro-6-bromo-1:3:5-triazine. After recrystallization from benzene it melts at 205° to 206° C.

*Example 2*

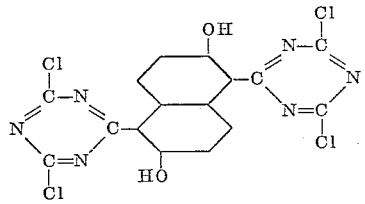

5 parts of 2:6-di-hydroxynaphthalene are introduced into a melt of 54 parts of aluminum chloride and 48 parts of cyanuric chloride at 130° to 135° C. The whole is stirred for three hours, and then the reaction mixture is poured into dilute hydrochloric acid. The excess of cyanuric chloride is decomposed by introducing steam for 15 minutes. The residue is filtered off, washed with water and dried. There is obtained, by recrystallization from nitrobenzene a product which crystallizes in yellow prisms and melts at 277° C. (with decomposition), and which by analysis is probably tetrachloro di-triazino-di-hydroxynaphthalene.

*Example 3*

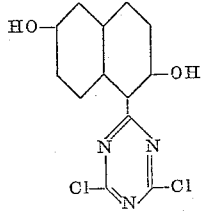

A mixture of 12 parts of finely divided 2:6-di-hydroxynaphthalene, 10 parts of ground aluminum chloride and 150 parts by volume of benzene is stirred for 30 minutes at 60° C., then 13.8 parts of cyanuric chloride are added in small portions at 0 to 5° C. The whole is then stirred for 8 hours at 0 to 5° C., and the reaction is completed by stirring for a long time at room temperature. The reaction product is decomposed in dilute hydrochloric acid, while cooling, whereupon the benzene is distilled off in as short a time as possible at approximately 50° C. under reduced pressure. The residue is filtered, and the filter residue is washed and dried at 70° C. under reduced pressure.

There is obtained in excellent yield 2-(2':6'-di-hydroxy-naphthyl-1')-4:6-dichloro-1:3:5-triazine, which after being recrystallized from dioxane, melts at 249° C. (corrected) with decomposition.

When the 2,6-dihydroxy-naphthalene mentioned in the first paragraph of this example is replaced by an equimolecular quantity of 2,7-dihydroxy-naphthalene, there is obtained the 2-(2'-7'-dihydroxy-naphthyl-1')-4,6-dichloro-1,3,5-triazine melting at 263° C. (corrected).

*Example 4*

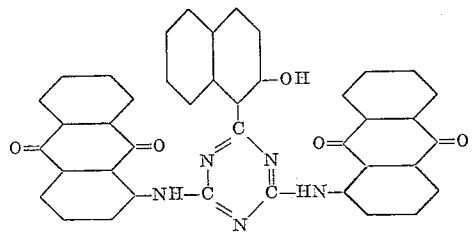

A mixture of 9.2 parts of aminoanthraquinone, 5.8 parts of 2-(2'-hydroxynaphthyl-1')-4:6-dichloro-1:3:5-triazine and 150 parts by volume of nitrobenzene is slowly heated to 170° C. and is then stirred until the reaction is complete. The dyestuff, which crystallizes in yellow prisms, is filtered off at 80° C., washed with alcohol and dried. It dyes cotton from a red-orange vat yellow tints of excellent fastness to chlorine, washing, boiling soda and light.

By using, instead of 1-amino-anthraquinone, an equivalent quantity of 1-amino-3-chloranthraquinone, 1-amino-3-bromanthraquinone, 1-amino-5-benzoylamino-anthraquinone or 1-amino-5-(ortho-fluorbenzoylamino) anthraquinone, there are likewise obtained dyestuffs yielding very fast yellow tints.

A fast red dyestuff is obtained by correspondingly reacting 1-amino-4-benzoylamino-anthraquinones, and blue dyestuffs are obtained by using 4-amino-5'-chloro- or 4-amino-3':5'-dichloroanthraquinone-2:1(N)1':2'(N)-benzacridone.

*Example 5*

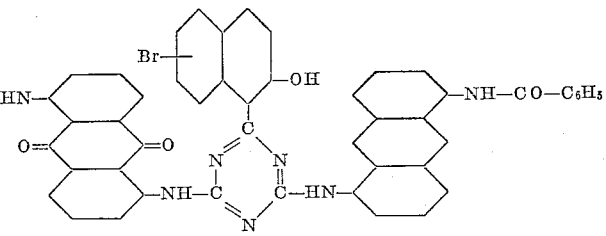

A mixture of 4 parts of 1-amino-5-benzoylamino-anthraquinone and 2 parts of the product obtained as described in the third paragraph of Example 1 and 100 parts by volume of nitrobenzene is stirred for 20 hours at 170 to 175° C. The dyestuff is filtered off at 90° C. and washed with alcohol and dried. It contains one bromine atom, and dyes from a red-brown vat strong orange tints having excellent general properties of fastness.

By using in this example, instead of the 1-amino-5-benzoylamino-anthraquinone, an equivalent quantity of 1-amino-anthraquinone there is obtained a more greenish-yellow dyestuff and by using 1-amino-4-benzoylamino-anthraquinone a red dyestuff is obtained.

Example 6

A solution of 1 part of bromine, 0.85 part of sulfuryl chloride and 10 parts by volume of nitrobenzene is slowly introduced dropwise into a mixture of 6.75 parts of the dyestuff obtained as described in the first paragraph of Example 4, 0.1 part of iodine and 150 parts by volume of nitrobenzene at 75° C. while stirring. Stirring is continued for a further 20 hours and after cooling the mixture the dyestuff is filtered off. By analysis it contains 6.33% of bromine, and it dyes cotton from a red-orange vat fast full yellow tints.

Example 7

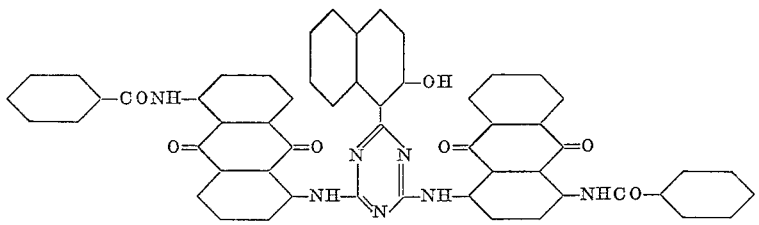

12 parts of 2-(2'-hydroxynaphthyl-1')-4:6-dichloro-1:3:5-triazine is introduced, in the course of 10 minutes into a solution of 11.7 parts of 1-amino-4-benzoylamino-anthraquinone in 100 parts of N-methyl-pyrrolidone at 100° C., while stirring, and the whole is stirred for three hours. The crystalline product, which is in the form of orange colored needles is filtered off at 90° C. then washed with alcohol and water and dried. It is 2-(2'-hydroxy-naphthyl-1') - 4 - chloro - 6 - (4''-benzoylamino - anthraquinonyl-1'')-amino-1:3:5-triazine.

6.7 parts of this intermediate product are condensed with 5 parts of 1-amino-5-benzoylamino-anthraquinone in 120 parts of nitrobenzene for 15 hours at 190 to 195° C. The dyestuffs so obtained dye cotton from a red vat fast reddish-brown tints.

Example 8

1 part of the dyestuff obtained as described in the first paragraph of Example 4 is vatted at 45° C. in 100 parts of water with the addition of 4 parts by volume of a sodium hydroxide solution of 30% strength and 2 parts of sodium hydrosulfite. The stock vat so obtained is added to a solution of 4 parts by volume of sodium hydroxide solution of 30% strength and 2 parts of sodium hydrosulfite in 2000 parts of water. In the dyebath so prepared 100 parts of cotton are dyed for one hour at 40 to 50° C. with the addition of 10 parts of sodium chloride. The cotton is then squeezed, oxidized in the air, rinsed, acidified, again rinsed, soaped at the boil. The material is dyed a strong yellow tint, and the dyeing has very good properties of fastness.

What I claim is:

The compound of the formula

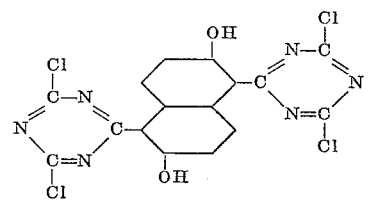

References Cited in the file of this patent

UNITED STATES PATENTS

| | | |
|---|---|---|
| 1,561,095 | Fritzsche et al. | Aug. 25, 1925 |
| 1,566,742 | Fritzsche et al. | Dec. 22, 1925 |
| 2,691,020 | Gadea et al. | Oct. 5, 1954 |